US012664141B2

(12) United States Patent
Lan et al.

(10) Patent No.: US 12,664,141 B2
(45) Date of Patent: Jun. 23, 2026

(54) LOCALLY-STORED VECTOR EMBEDDING DATABASES

(71) Applicant: Salesforce, Inc., San Francisco, CA (US)

(72) Inventors: Zhujun Lan, San Francisco, CA (US); Jonathan Gellin, Raleigh, NC (US); Walter Harley, Bellevue, WA (US); Bo Pang, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 19/041,172

(22) Filed: Jan. 30, 2025

(65) Prior Publication Data

US 2026/0079904 A1     Mar. 19, 2026

Related U.S. Application Data

(60) Provisional application No. 63/694,515, filed on Sep. 13, 2024.

(51) Int. Cl.
| | |
|---|---|
| *G06F 16/22* | (2019.01) |
| *G06F 16/21* | (2019.01) |
| *G06F 16/23* | (2019.01) |
| *G06F 16/245* | (2019.01) |

(52) U.S. Cl.
CPC ........ *G06F 16/2237* (2019.01); *G06F 16/212* (2019.01); *G06F 16/23* (2019.01); *G06F 16/245* (2019.01)

(58) Field of Classification Search
CPC .... G06F 16/2237; G06F 16/212; G06F 16/23; G06F 16/245
See application file for complete search history.

(56) References Cited

U.S. PATENT DOCUMENTS

| | | | | |
|---|---|---|---|---|
| 12,235,882 | B1 * | 2/2025 | Chawla ................. | G06F 16/285 |
| 2024/0134614 | A1 * | 4/2024 | Bakshi ..................... | G06F 8/65 |
| 2024/0346256 | A1 * | 10/2024 | Qin ........................ | G06F 40/216 |
| 2025/0077595 | A1 * | 3/2025 | Ahmed .............. | G06F 16/9535 |
| 2025/0111159 | A1 * | 4/2025 | Huang ................... | G06F 40/35 |
| 2025/0117414 | A1 * | 4/2025 | McCurdy ........... | G06F 16/3329 |
| 2025/0117418 | A1 * | 4/2025 | McCurdy ........... | G06F 16/3347 |

* cited by examiner

*Primary Examiner* — James E Richardson
(74) *Attorney, Agent, or Firm* — Holland & Hart, LLP.

(57) ABSTRACT

Methods, apparatuses, and computer-program products are disclosed. The method may include storing, on a local machine, a first vector database and a second vector database that include first and second vector embeddings of first and second context information. The method may include receiving a query requesting generation of code. The method may include comparing a third vector embedding that is based on the query with the plurality of first vector embeddings and the plurality of second vector embeddings to identify one or more first vector embeddings and one or more second vector embeddings. The method may include generating a prompt that may include the query, first information and second information corresponding with the one or more first and second vector embeddings. The method may include generating, with a generative artificial intelligence (AI) model, a response to the query based on the query, the first information, and the second information.

16 Claims, 11 Drawing Sheets

```
{
    "name": "Contact",
    "fields": [
            {
                    "name": "rid",
                    "type": "string"
            }
            {
                    "name": "name",
                    "type": "string"
            }
            {
                    "name": "addressLine1",
                    "type": "string"
            }
            {
                    "name": "addressLine2",
                    "type": "string"
            }
            {
                    "name": "city",
                    "type": "string"
            }
            {
                    "name": "state_province",
                    ""type": "string"
            }
            {
                    "name": "country",
                    "type": "string"
            }
            {
                    "name": "postalCode",
                    "type": "string"
            }
            {
                    "name": "phoneNumber",
                    "type": "string"
            }
            {
                    "name": "emailAddress",
                    "type": "string"
            }
    ]
}
```

Prompt 320

Schema 310

```
public with sharing class Calc {
        public Calc() {

}
        public Double sum(Double a, Double b) {
                return a + b;
        }
        public Double sub(Double a, Double b) {
                return a - b;
        }
        public Double mul(Double a, Double b) {
                return a * b;
        }
        public Double div(Double a, Double b) {
                return a / b;
        }
}
```

Uncompressed
Class 410

Prompt
420

```
public with snaring class Calc {
        public Calc();
        public Double sum(Double a, Double b);
        public Double sub(Double a, Double b);
        public Double mul(Double a, Double b);
        public Double div(Double a, Double b);
}
```

Compressed
Class 415

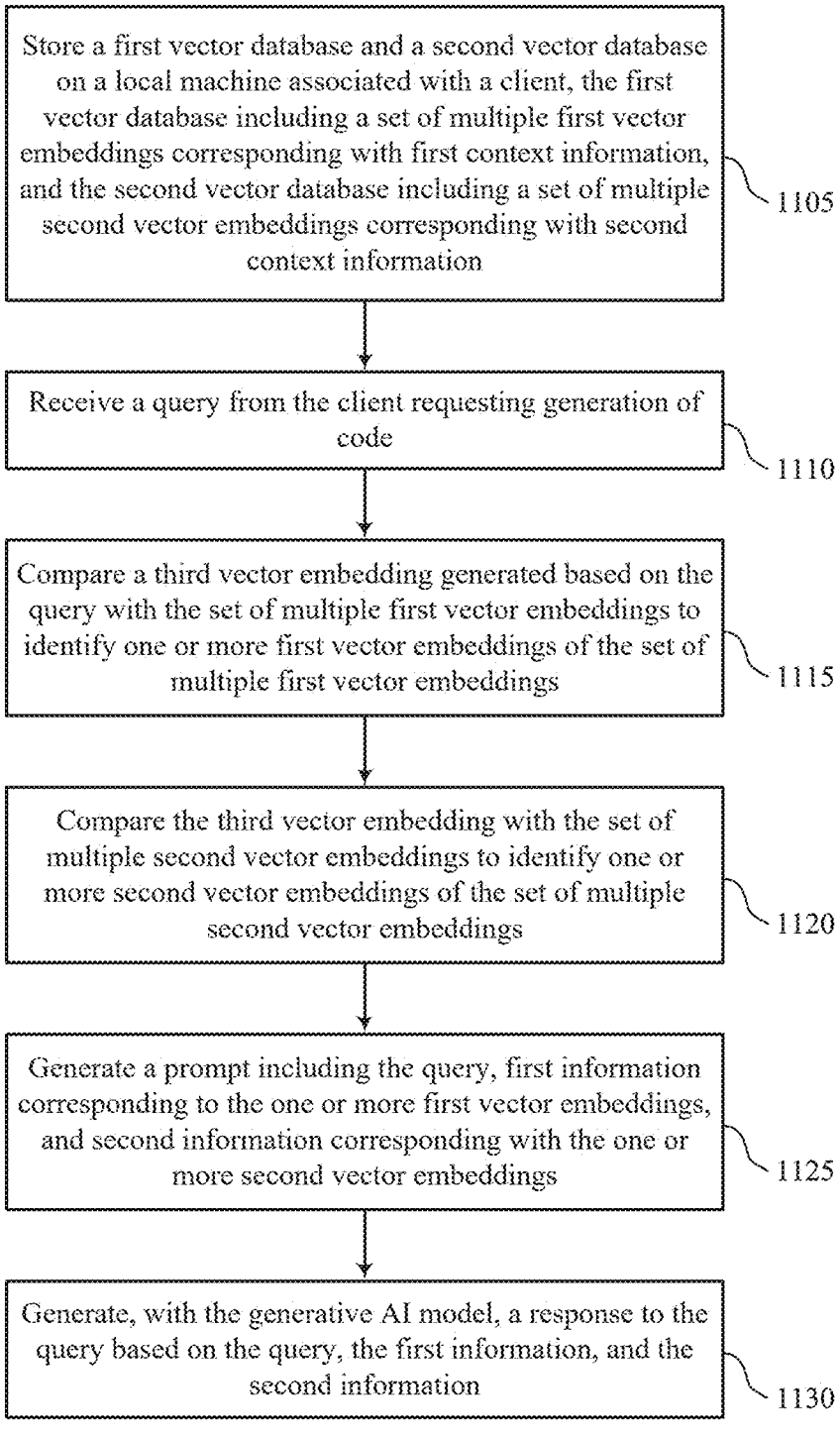

Store a first vector database and a second vector database on a local machine associated with a client, the first vector database including a set of multiple first vector embeddings corresponding with first context information, and the second vector database including a set of multiple second vector embeddings corresponding with second context information

1105

Receive a query from the client requesting generation of code

1110

Compare a third vector embedding generated based on the query with the set of multiple first vector embeddings to identify one or more first vector embeddings of the set of multiple first vector embeddings

1115

Compare the third vector embedding with the set of multiple second vector embeddings to identify one or more second vector embeddings of the set of multiple second vector embeddings

1120

Generate a prompt including the query, first information corresponding to the one or more first vector embeddings, and second information corresponding with the one or more second vector embeddings

1125

Generate, with the generative AI model, a response to the query based on the query, the first information, and the second information

LOCALLY-STORED VECTOR EMBEDDING DATABASES

CROSS REFERENCE

The present Application for Patent claims priority to U.S. Provisional Ser. No. 63/694,515, by Lan et al., entitled "LOCALLY-STORED VECTOR EMBEDDING DATA-BASES," filed on Sep. 13, 2024, assigned to the assignee hereof, and expressly incorporated by reference herein.

FIELD OF TECHNOLOGY

The present disclosure relates generally to database systems and data processing, and more specifically to locally-stored vector embedding databases.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some approaches, generative artificial intelligence (AI) may be employed to generate code or other responses to user queries. However, such approaches may be improved.

BRIEF DESCRIPTION OF THE DRAWINGS

FIG. 3 shows an example of a schema scheme that supports locally-stored vector embedding databases in accordance with examples as disclosed herein.

FIG. 4 shows an example of a class compression scheme that supports locally-stored vector embedding databases in accordance with examples as disclosed herein.

FIG. 11 shows a flowchart illustrating methods that support locally-stored vector embedding databases in accordance with examples as disclosed herein.

DETAILED DESCRIPTION

Figure 1:
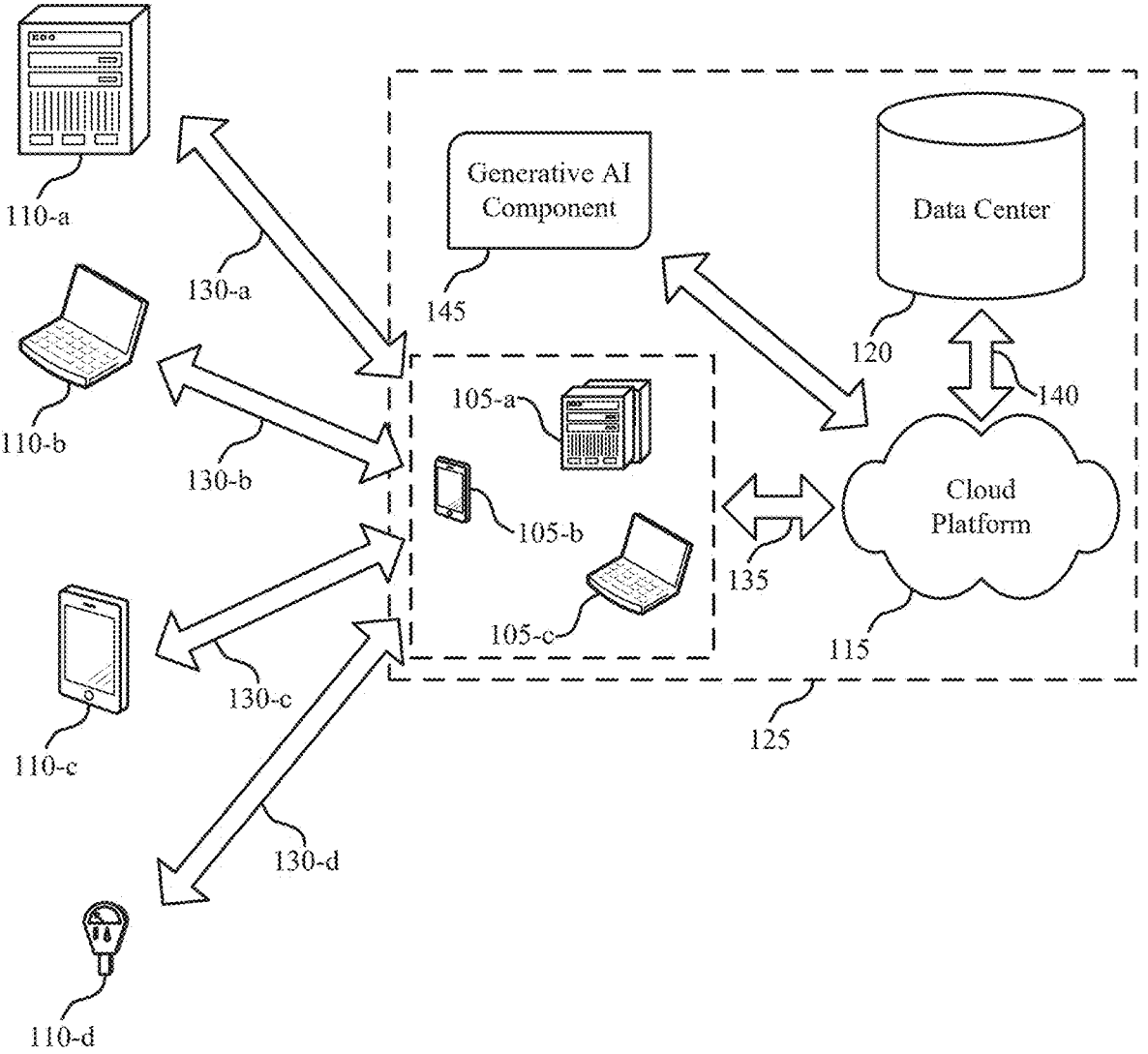
FIG. 1 illustrates an example of a generating code using a generative AI model system that supports locally-stored vector embedding databases in accordance with examples as disclosed herein.

In some cloud computing scenarios, developers may develop code for various solutions and may support such efforts with the use of generative artificial intelligence (AI) models. However, in some approaches, the use of such generative AI models may be improved. For example, during development, a developer may create custom objects, definitions, or other code elements. Further, the developer may employ information, techniques, or scenarios that may involve multiple domains (e.g., knowledge domains, information domains, business domains, or other domains). These elements (e.g., custom objects and multiple knowledge domains) may not be available to the generative AI model, which often runs on a cloud platform away from a developer's local machine and may, in some cases, only access information of a single domain to aid in generating responses (e.g., code requested by the developer) or may not access any additional domains at all, instead relying solely on the initial training of the generative AI model.

In some examples, a system may employ retrieval augmented generation (RAG) techniques to be used in concert with a generative AI model. In some examples, the system may locate one or more vector databases (e.g., on a per-client basis) that are to be used for RAG techniques on a local machine associated with the client. Further, in some examples, the system may use multiple vector databases (e.g., in a "daisy-chained" fashion) to provide for vector comparison and information retrieval across multiple domains. For example, a user may have one or more local vector databases on a local machine, which may be used to compare a vector embedding associated with a query (e.g., requesting code generation or other generative AI model processing) with vector embeddings in the local vector databases to retrieve corresponding relevant portions of information, which may be used to supplement a prompt sent to a generative AI model, so that the generative AI model has additional contextual information to aid in producing the response to the prompt (e.g., generated code that is responsive to the request to generate code).

In some examples, the information that is associated with vector embeddings in the vector embedding databases may be data objects or definitions thereof, class definitions, database schema information, domain-specific knowledge, or other information that may be helpful for generative AI model processing. In some examples, the vector databases on the local machine may be updated based on additional user input (e.g., additional custom objects, database schemas, domain-specific information, or other information). In some examples, the vector embedding matching may be performed based on satisfaction of a similarity score threshold (e.g., a match is determined for those pairings for which the similarity score satisfies the threshold).

Aspects of the disclosure are initially described in the context of an environment supporting an on-demand database service. Aspects of the disclosure are then described with reference to a generative AI system, a schema scheme, a class compression scheme, a chaining scheme, a code generation scheme, and a process flow. Aspects of the disclosure are further illustrated by and described with reference to apparatus diagrams, system diagrams, and flowcharts that relate to locally-stored vector embedding databases.

FIG. 1 illustrates an example of a system 100 for cloud computing that supports locally-stored vector embedding databases in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

In various implementations, the models and/or modules described herein may be classification, predictive, generative, conversational, or another form of AI technology, such as AI model(s), agents, etc., implementing one or more forms of machine learning, a neural network, statistical modeling, deep learning, automation, natural language processing, or other similar technology. The AI technology may be included as part of a network or system comprising a hardware-or software-based framework for training, processing, fine-tuning, or performing any other implementation steps. Furthermore, the AI technology may include a hardware-or software-based framework that performs one or more functions, such as retrieving, generating, accessing, transmitting, etc. The AI technology may be implemented by a computer including a register coupled with a processor or a central processing unit (CPU).

Moreover, the AI technology may be trained or fine-tuned using supervised, unsupervised, or other AI training techniques. In various implementations, the AI technology may be trained or fine-tuned using a set of general datasets or a set of datasets directed to a particular field or task. Additionally, or alternatively, the AI technology may be intermittently updated at a set interval or in real time based on resulting output or additional data to further train the AI technology. The AI technology may offer a variety of capabilities including text, audio, image, and other content generation, translation, summarization, classification, prediction, recommendation, time-series forecasting, searching, matching, pairing, and more. These capabilities may be provided in the form of output produced by the AI technology in response to a particular prompt or other input. Furthermore, the AI technology may implement RAG or other techniques after training or fine-tuning by accessing a set of documents or knowledge base directed to a particular field or website other than the training or fine-tuning data to influence the AI technology's output with the set of documents or knowledge base.

To further guide and train output of the AI technology, a plurality of input prompts may be provided to the AI technology for the purpose of eliciting particular responses. In various implementations, the plurality of input prompts may correspond to the particular field or task to which the AI technology is trained. Additionally, the AI technology may be implemented along with a plurality of additional AI technologies. For example, a first AI model may produce a first output, which is used as input for a second AI model to produce a second output. These AI technologies may be used in succession of one another, in parallel with another, or a combination of both. Furthermore, the AI technologies may be merged in a variety of implementations, for example, by bagging, boosting, stacking, etc. the AI technologies.

Additionally, or alternatively, the system 100 may support the use of a large language model (generative AI model), such as the generative AI component 145. In some examples, a generative AI component 145 may also be referred to as any of an AI, a generative AI, a generative AI model, or a large language model (LLM). The generative AI component 145 may be a model that is trained on a corpus of input data, which may include text, images, video, audio, structured data, or any combination thereof. Such data may represent general-purpose data, domain-specific data, or any combination thereof. Further, a generative AI component 145 may be supplemented with additional training on data associated with a role, function, or generation outcome to further specialize the generative AI component 145 and increase the accuracy and relevance of information generated with the generative AI component 145.

In some examples, the cloud platform 115 may receive a query from a cloud client 105 that may include a request to produce a response (e.g., text, images, video, audio, or other information) to the query using the generative AI component 145. The cloud platform 115 may transmit a prompt to the generative AI component 145 that includes the query (or information included therein) and receive the generated output (e.g., text, images, video, audio, or other information) that is responsive to the prompt. In some examples, the cloud platform 115 may modify or supplement one or more aspects of the query to increase the quality of the response. In some examples, such modification or supplementation may be referred to as grounding.

The system 100 may support any configuration for the use of generative AI models. In FIG. 1, the generative AI component 145 is depicted as being located outside of the subsystem 125. However, the generative AI component 145 may be hosted on the cloud platform 115, elsewhere within the subsystem 125, or outside the subsystem 125 (e.g., a publicly-hosted platform). Additionally, or alternatively, multiple generative AI components 145 may be employed to perform one or more of the actions described as being performed by a single generative AI component 145. Further, in some examples, the generative AI component 145 may communicate with one or more other elements, such as a contact 110, the data center 120, one or more other elements, or any combination thereof, to receive additional information (e.g., that may be indicated in the query or the prompt) that is to be considered for performing generative processes.

In various implementations, the models and/or modules described herein (e.g., including, but not limited to, the generative AI component 145) may be classification, predictive, generative, conversational, or another form of AI technology, such as AI model(s), agents, etc., implementing one or more forms of machine learning, a neural network, statistical modeling, deep learning, automation, natural language processing, or other similar technology. The AI technology may be included as part of a network or system comprising a hardware-or software-based framework for training, processing, fine-tuning, or performing any other implementation steps. Furthermore, the AI technology may include a hardware-or software-based framework that performs one or more functions, such as retrieving, generating, accessing, transmitting, etc. The AI technology may be implemented by a computer including a register coupled with a processor or a central processing unit (CPU).

Moreover, the AI technology may be trained or fine-tuned using supervised, unsupervised, or other AI training techniques. In various implementations, the AI technology may be trained or fine-tuned using a set of general datasets or a set of datasets directed to a particular field or task. Additionally, or alternatively, the AI technology may be intermittently updated at a set interval or in real time based on resulting output or additional data to further train the AI technology. The AI technology may offer a variety of capabilities including text, audio, image, and other content generation, translation, summarization, classification, prediction, recommendation, time-series forecasting, searching, matching, pairing, and more. These capabilities may be provided in the form of output produced by the AI technology in response to a particular prompt or other input. Furthermore, the AI technology may implement Retrieval-Augmented Generation (RAG) or other techniques after training or fine-tuning by accessing a set of documents or knowledge base directed to a particular field or website other than the training or fine-tuning data to influence the AI technology's output with the set of documents or knowledge base.

To further guide and train output of the AI technology, one or more input prompts may be provided to the AI technology for the purpose of eliciting particular responses. In various implementations, the input prompts may correspond to the particular field or task to which the AI technology is trained. Additionally, or alternatively, the AI technology may be implemented along with one or more additional AI technologies. For example, a first AI model may produce a first output, which is used as input for a second AI model to produce a second output. These AI technologies may be used in succession of one another, in parallel with another, or a combination of both. Furthermore, the AI technologies may be merged in a variety of implementations, for example, by bagging, boosting, stacking, etc. the AI technologies.

In some examples, the cloud platform 115, a cloud client 105, or both, may store, on a machine local to the cloud client 105, a first vector database and a second vector database that include first and second vector embeddings of first and second context information. The cloud platform 115 may receive a query requesting generation of code from the cloud client 105. In some examples, the cloud platform 115 may generate a third vector embedding that corresponds with or is based on the query and may transmit this third vector embedding to the client. The cloud client 105 may compare the third vector embedding with the plurality of first vector embeddings and the plurality of second vector embeddings to identify one or more first vector embeddings and one or more second vector embeddings. The cloud platform 115, a cloud client 105, or both may generate a prompt that includes the query, first information and second information corresponding with the one or more first and second vector embeddings. The cloud platform 115 may generate, with a generative AI model (e.g., the generative AI component 145 or a portion thereof), a response to the query that is based on the query, the first information, and the second information.

In some examples, one of the significant challenges in leveraging large language models (LLMs) for code generation is effectively using database schema metadata as context. Traditional methods of managing and utilizing schema metadata are inefficient and inflexible, making it difficult to seamlessly integrate this data into the code generation process. This limitation hampers the ability to produce accurate and contextually relevant code, slowing down development cycles and reducing productivity. Businesses and developers struggle with the inefficiency of accessing and using schema metadata, which impacts their ability to quickly generate and deploy high-quality code.

The techniques described herein address this and other challenges by extracting database schema metadata (object and field entity metadata) from a relational database and stores it in a JSON format within a vector database. This stored metadata is then utilized to ground the code generation process in a retrieval-augmented system. By using an embedding model, the schema is converted into vectors, enabling efficient storage and retrieval. When a natural language query is made, a corresponding vector is generated and matched against the stored vectors in the database to retrieve the relevant schema information. For instance, a developer querying for specific database structures can quickly obtain the schema details, which are then used to provide accurate and contextually relevant code snippets. This seamless integration of schema metadata into the code generation process ensures that the generated code is well-grounded in the actual database structure, significantly enhancing development speed and accuracy.

Further, the vector databases may be stored locally at a user's machine, and the vector databases may include vector databases that are associated with multiple domains or contexts. By employing the database schema metadata in multiple, local vector databases at a developer's local machine, operational efficiency and update speed and frequency may be improved, with negligible costs for storage at the local machine. Further, the use of multiple domains allows for improved accuracy and relevance of responses generated by the generative AI model. Further, by storing such information locally (e.g., at a client machine or otherwise local to a client), the client may maintain security of the data that is being processed or stored in the vector databases, as such data may be controlled and may not be uploaded to a remote location (e.g., at a cloud platform). Further, such operations may allow multiple developers to work from a common source repository (e.g., at a cloud system), but with their own customizations (e.g., stored at the local machine) while still allowing all users access to utilize the generative AI model processing.

For example, a developer or other user may create one or more custom objects, schemas, knowledge articles, or other custom information or resources associated with development projects (or other work). The developer may submit the resources to the system to generate the vector databases and the vector databases may be stored on the local machine or at a location local to the local machine (e.g., at a location other than a location where the generative AI model may be located or hosted). The developer may then submit a query for code generation to the system, which may generate a vector embedding from the query and may compare the vector embedding with vector embeddings in the vector databases to identify information that may be relevant to the query. The system may then assemble a prompt that includes the query and the identified information relevant to the query and pass this prompt to the generative AI model, which may process the prompt and create a response (e.g., generated code) based on the prompt. The response may be provided to the developer, which may then incorporate the generated code or other results into the developer's work.

It should be appreciated by a person skilled in the art that one or more aspects of the disclosure may be implemented in a system 100 to additionally, or alternatively, solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
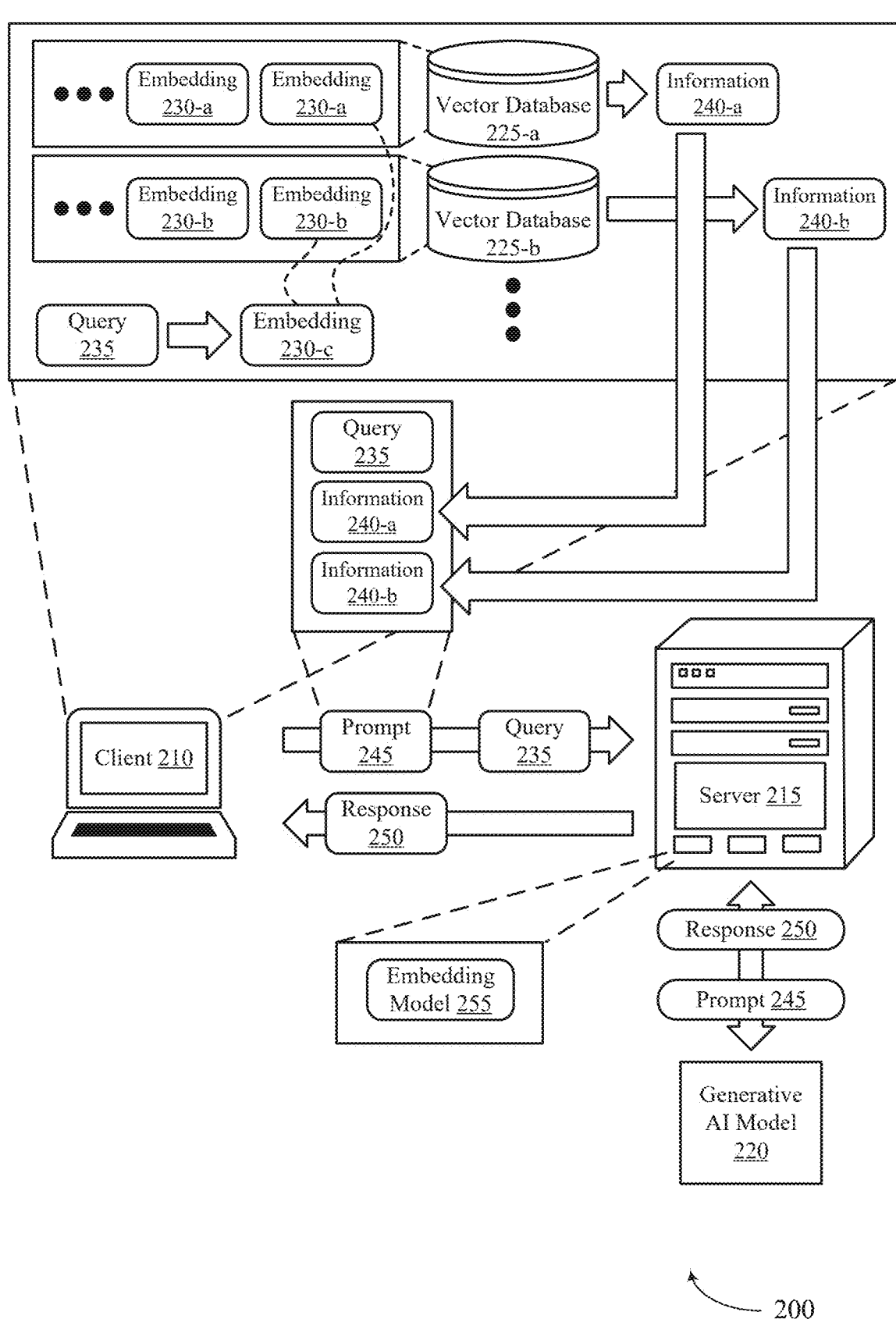
FIG. 2 shows an example of a generative AI system that supports locally-stored vector embedding databases in accordance with examples as disclosed herein.

FIG. 2 shows an example of a generative AI system 200 that supports locally-stored vector embedding databases in accordance with examples as disclosed herein. The generative AI system 200 may include the client 210, the server 215, and the generative AI model 220, which all may communicate with one another to perform the techniques described herein. Though operations may be described as being performed by one or more elements of the system 200, any of the techniques or operations described herein may be performed by any of the elements of the system 200 or any other device, program, or element capable of performing such operations.

In some examples, the system 200 may store a first vector database 225-*a* and a second vector database 225-*b* on a local machine (e.g., that is associated with the client 210). The first vector database 225-*a* and the second vector database 225-*b* may each include respective embeddings (e.g., the embeddings 230-*a* and the embeddings 230-*b*) which may be vector embeddings of information. This information may include various types of information, including database object and field entity metadata, database schemas, class definitions (e.g., compressed class definitions or uncompressed class definitions, either of which may be associated with one or more programming languages), domain-specific knowledge (e.g., business domains, knowledge areas, or other information), context information (e.g., associated with operation of the generative AI model in one or more contexts or roles of the generative AI model), any other information that may be used to aid the generative AI model 220 in responding to a query 235 or a prompt 245, or any combination thereof. For example, the first vector database 225-*a* may be associated with (e.g., contain vector embeddings of information associated with) a custom database schema and the second vector database 225-*b* may be associated with (e.g., contain vector embeddings of information associated with) custom objects for a programming language. Thus, for the generative AI model 220 to be aware of and utilize such information to generate the response 250 (which may include code related to the database schema and the custom objects, for example), it may be desirable to provide this information to the generative AI model. As such, the techniques described herein allow the system 200 to identify information relevant to the query 235 and provide such information to the generative AI model 220 to aid in generating the response 250. In some examples, the embeddings 230 may be generated based on or using the embedding model 255, which may be located at the server 215 or other element of a cloud system.

In some examples, the system 200 may receive the query 235 from the client 210. The query 235 may include a request for the system 200 to generate code based on one or more parameters or guidelines included in the query 235.

In some examples, the system 200 may transmit the query 235 to the server 215 for the server 215 to generate an embedding 230-*c* based on the query 235 (e.g., based on or using the embedding model 255). This embedding 230-*c* may be transmitted back to the client 210. The client 210 may compare this generated embedding to the embeddings

230 of the vector database 225-*a*, the vector database 225-*b*, or both, to identify one or more of the embeddings 230 that match with (e.g., achieve at least a threshold similarity score) with the generated embedding for the query 235. In turn, the system 200 may then retrieve the information 240-*a*, the information 240-*b*, or both, which may correspond with identified embeddings 230 in the vector databases 225. Though an example of two databases, two embeddings, and two items of information is described, any quantity of databases, embeddings, information, or any combination thereof, may be employed.

In some examples, the system 200 may generate the prompt 245. The prompt 245 may include one or more elements of the query 235, the information 240-*a*, the information 240-*b*, or any combination thereof. By including the information 240 in the prompt 245, the generative AI model 220 may be better grounded for responding to the prompt 245, as the generative AI model 220 may be aware of the information 240 that has already been determined to be relevant to the prompt 245, and the quality and relevance of the response 250 that is to be generated will be improved.

In some examples, the client 210 may provide the prompt 245 to the server 215, which may provide the prompt 245 to the generative AI model 220. The generative AI model 220 may process the prompt 245 (e.g., including the query 235 and the information 240) and may generate the response 250, which may be provided to the client 210 (e.g., via the server 215).

In some examples, a user associated with the client 210 may update one or more items of information, such as class definitions, custom objects, database schemas, domain-specific knowledge, context information, or any other information that may be helpful to aid the generative AI model 220 in generating the response 250. As such, it may be desirable to update the information, the embeddings 230, or both, to include such updates made by the user. As such, the client 210 may provide an interface and options for the user to provide updated information not in the vector databases 225. In some examples, the client 210 may utilize the embedding model 255 to perform one or more updates of the vector databases 225 (e.g., to generate new embeddings 230 or to modify existing embeddings 230). In some examples, though initial creation of the vector databases 225 may involve some time, small updates to the vector databases 225 or the embeddings 230 stored therein may be relatively small and may be performed efficiently and locally at the client 210. In some examples, in between updates, of the vector databases 225, changes may be cached or stored temporarily until the updates can be performed.

An example may be illustrative. Suppose that a developer in an education context is managing a database, and may have custom objects for schools, students, courses, and grades. Further, a developer may desire to write a function to assemble a student's transcript that may receive a student's identifier as an input parameter and may provide the transcript, including relevant information such as grades for different courses at different schools for the student. These different custom objects may be considered to be different domains that may be useful for generating the response 250.

In the course of work, the developer may request assistance from the generative AI model 220 in the query 235. However, the generative AI model 220, with its base training, may not be aware of the custom objects or other custom information created by the developer. Thus, the system 200 may analyze the query 235 and generate the embedding 230-*c* based on the content of the query and compare the embedding 230-*c* with the embeddings 230-*a* and embeddings 230-*b* in the vector databases 225 to determine which embeddings 230-*a*, embeddings 230-*b*, or both, may be relevant to the query 235. By comparing these embeddings, the system 200 may determine which embeddings may be embeddings related to the custom objects for schools, students, courses, and grades, and therefore which information 240 is to be included in the prompt 245 to provide the knowledge of the custom objects to the generative AI model 220. The generative AI model 220 may then generate the response 250 based on the provided information 240, and the generated code may then include or refer to elements of the information 240 (e.g., the custom objects for schools, students, courses, and grades, as well as information about database schemas, classes, the programming language being used, or any combination thereof) so that the generated code may be useful for the developer to implement.

FIG. 3 shows an example of a schema scheme 300 that supports locally-stored vector embedding databases in accordance with examples as disclosed herein. The schema scheme 300 may include the schema 310, which may be one example of information (e.g., information 240) that may be included in the prompt 320 provided to a generative AI model to generate a response to a client query.

For example, a developer may work on a database project and may create connectors to be used to connect to a database. The developer may request that the generative AI model generate code to be used for structured query language (SQL) queries and the developer may desire that the SQL query code be informed by a knowledge of the database schema 310. As the schema 310 may be a custom schema, the generative AI model, without the techniques described herein, may not be aware of the custom schema.

Thus, a vector embedding of the query may be compared to vector embeddings in the local vector databases, which may include vector embeddings that are based on the schema 310. The matching process may identify which vector embeddings are based on the schema 310 by comparing them with the query vector embedding, after which the chunks of information corresponding with the identified vector embeddings may be provided and included in the prompt 320, which may result in increased quality and relevance of the generated responses.

FIG. 4 shows an example of a class compression scheme 400 that supports locally-stored vector embedding databases in accordance with examples as disclosed herein. The class compression scheme 400 may relate to the uncompressed class 410 and the compressed class 415, which may be examples of information (e.g., information 240) that may be included in the prompt 420 provided to a generative AI model to generate a response to a client query.

Classes may be structures that are commonly used in programming languages, which may provide extended, customizable functionality. Frequently, developers may create custom classes that are not present in the "base" or default programming language (e.g., where such custom classes may be stored on a local machine used by a developer). However, a generative AI model may not be aware of such custom classes and, as a result, responses from the generative AI model may not account for such classes. Thus, it may be desirable to provide such class information to the generative AI model to produce responses that may be aware of or incorporate such classes into generated code.

In some examples, it may be desirable to compress the class information before creating vector embeddings. For example, the compressed class 415 may be considered to be a summarized version of the uncompressed class 410, and may include the class declaration and declarations of various members of the class in a compressed manner. This compressed class 415 may be used to generate vector embeddings associated with the compressed class 415 which may be stored in local vector embedding databases and used for comparison operations as described herein, which may result in extraction of one or more portions of the compressed class 415 or information thereof, which may be included in prompts provided to a generative AI model, thereby allowing the generative AI model to be aware of the uncompressed class 410, the compressed class 415, or both and accordingly generate responses based on the uncompressed class 410, the compressed class 415, or both.

Figure 5:
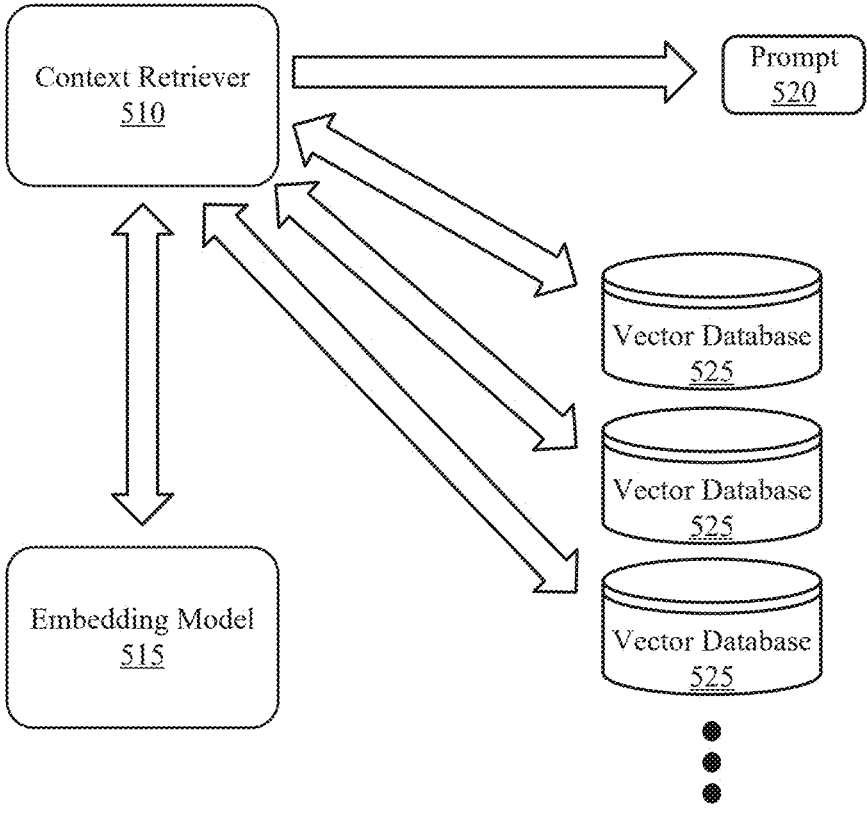
FIG. 5 shows an example of a chaining scheme that supports locally-stored vector embedding databases in accordance with examples as disclosed herein.

FIG. 5 shows an example of a chaining scheme 500 that supports locally-stored vector embedding databases in accordance with examples as disclosed herein. The chaining scheme 500 may relate to a context retriever 510, an embedding model 515, multiple vector databases 525, and a prompt 520.

As described herein, it may be advantageous to include multiple vector databases 525 (e.g., at a local machine of a client). Thus, the techniques described herein may include the use of a context retriever 510 that may receive a query (e.g., for code generation) and may utilize the embedding model 515 to generate a vector embedding based on the query. Further, the context retriever 510 may search multiple vector databases 525 to match vector embeddings therein with the vector embedding generated from the query. Once these vectors are identified, the information associated with these vectors may be retrieved and may be included in the prompt 520 to be transmitted to the generative AI model, thereby increasing the quality and relevance of the response generated by the generative AI model.

Figure 6:
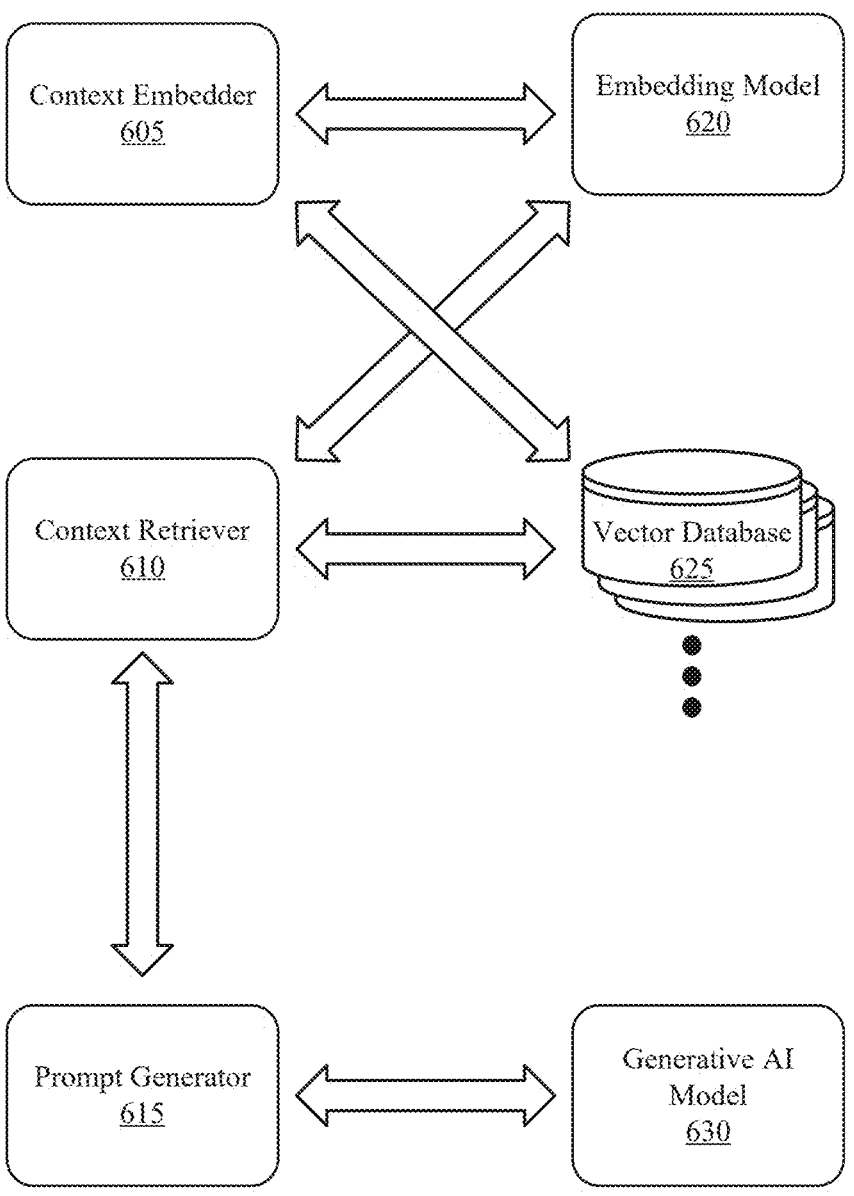
FIG. 6 shows an example of a code generation scheme that supports locally-stored vector embedding databases in accordance with examples as disclosed herein.

FIG. 6 shows an example of a code generation scheme 600 that supports locally-stored vector embedding databases in accordance with examples as disclosed herein. The code generation scheme 600 may involve the context embedder 605, the context retriever 610, the prompt generator 615, the embedding model 620, multiple vector databases 625, and the generative AI model 630. Though elements of the code generation scheme 600 are described herein as performing one or more functions or operations, any of the elements described herein may perform any of the functions or operations described throughout this disclosure.

In some examples, the context embedder 605 may coordinate generation of vector embeddings, including those vector embeddings that are to be stored in the multiple vector databases 625. For example, the context embedder 605 may obtain information (e.g., the information 240) and may utilize the embedding model 620 to generate the vector embeddings that are to be included in the vector databases 625.

In some examples, the context retriever 610 may retrieve one or more contexts, vectors, or other information. For example, the context retriever 610 may obtain the query and may utilize the embedding model 620 to generate one or more vector embeddings that are based on the query. Additionally, or alternatively, the context retriever 610 may perform or coordinate the comparison between the vector embeddings associated with the query and the vector embeddings that are stored in the vector databases 625, identify the vector embeddings of the vector databases 625 that satisfy one or more matching conditions (e.g., similarly scores between the query vector embedding and one or more vector embeddings of the vector databases 625 satisfying one or more similarity thresholds).

In some examples, the prompt generator 615 may retrieve or receive the information that corresponds with the matching vector embeddings of the vector databases 625 and may generate the prompt that is to be passed to the generative AI model 630. Such a prompt may include information from the initial query, the retrieved or received information, one or more additional grounding instructions or information (e.g., describing a role that the generative AI model is to perform), or any combination thereof. Further, the prompt generator 615 may receive the response from the generative AI model 630 and may format one or more portions of the response (e.g., in line with code formatting practices) for delivery or display at the client.

Figure 7:
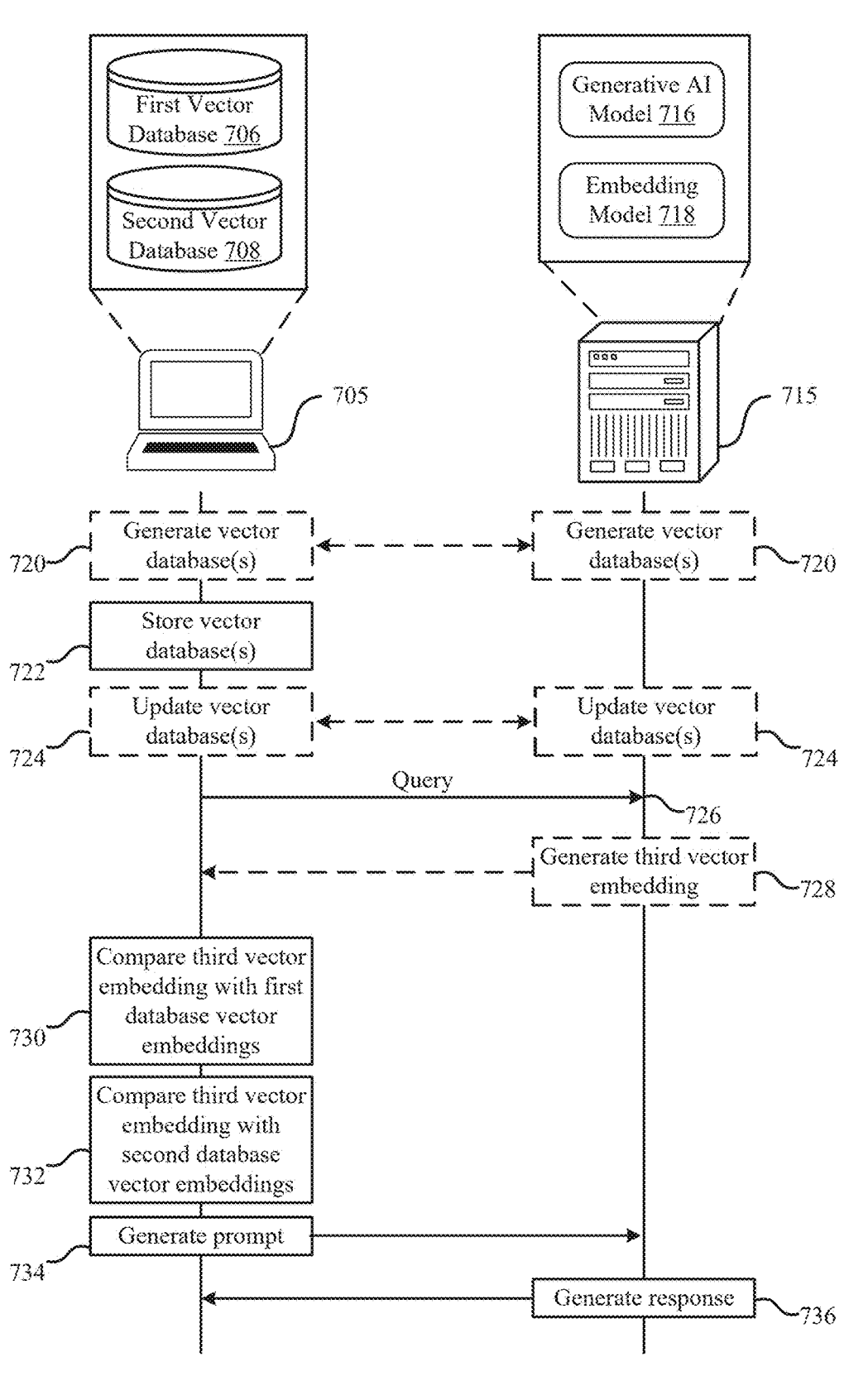
FIG. 7 shows an example of a process flow that supports locally-stored vector embedding databases in accordance with examples as disclosed herein.

FIG. 7 shows an example of a process flow 700 that supports locally-stored vector embedding databases in accordance with examples as disclosed herein.

The process flow 700 may implement various aspects of the present disclosure described herein. The elements described in the process flow 700 (e.g., client 705, first vector database 706, second vector database 708, application server 715, generative AI model 716, and embedding model 718) may be examples of similarly named elements described herein.

In the following description of the process flow 700, the operations between the various entities or elements may be performed in different orders or at different times. Some operations may also be left out of the process flow 700, or other operations may be added. Although the various entities or elements are shown performing the operations of the process flow 700, some aspects of some operations may also be performed by other entities or elements of the process flow 700 or by entities or elements that are not depicted in the process flow, or any combination thereof.

At 720, the client 705, the application server 715, or both, may generate, based on an embedding model 718, the first vector database 706 based on the first context information. Additionally, or alternatively, the application server 715 may generate, based on the embedding model 718, the second vector database 708 based on the second context information. In some examples, the first context information corresponds with a first processing context. In some examples, the second context information corresponds with a second processing context that is different than the first processing context.

At 722, the client 705, the application server 715, or both, may store a first vector database 706 and a second vector database 708 on a local machine associated with the client 705. The first vector database 706 may include a plurality of first vector embeddings corresponding with first context information and the second vector database 708 may include a plurality of second vector embeddings corresponding with second context information. In some examples, the first context information, the second context information, or both, comprise class definitions, database schema information, domain specific knowledge, code snippets, or any combination thereof. In some examples, the database schema information may include one or more custom object definitions that indicate one or more fields, one or more custom functions, or both. In some examples, the class definitions are compressed class definitions.

At 724, the client 705, the application server 715, or both, may update, at the local machine, the first vector database 706, the second vector database 708, or any combination thereof, based on updates to local data performed at the local machine. In some examples, updating the first vector database 706, the second vector database 708, or any combination thereof, is based on a rate of the updates to the local data satisfying an update rate threshold.

At 726, the application server 715 may receive a query from the client 705 requesting generation of code.

At 728, the application server 715 may generate the third vector embedding based on the query. In some examples, the third vector embedding is based on or is generated using the embedding model 718. In some examples, the embedding model 718 is located at a server (e.g., the application server 715) that is remote to the local machine.

At 730, the client 705 may compare a third vector embedding generated based on the query with the plurality of first vector embeddings to identify one or more first vector embeddings of the plurality of first vector embeddings. In some examples, comparing the third vector embedding with the plurality of first vector embeddings is based on first vector similarity scores associated with the one or more first vector embeddings satisfying a first vector embedding score threshold.

At 732, the client 705 may compare the third vector embedding with the plurality of second vector embeddings to identify one or more second vector embeddings of the plurality of second vector embeddings. In some examples, comparing the third vector embedding with the plurality of second vector embeddings is based on second vector similarity scores associated with the one or more second vector embeddings satisfying a second vector embedding score threshold. In some examples, the first vector embedding score threshold is different than the second vector embedding score threshold.

At 734, the client 705 may generate a prompt that may include the query, first information corresponding to the one or more first vector embeddings, and second information corresponding with the one or more second vector embeddings.

At 736, the application server 715 may generate, with the generative AI model 716, a response to the query based on the query, the first information, and the second information.

Figure 8:
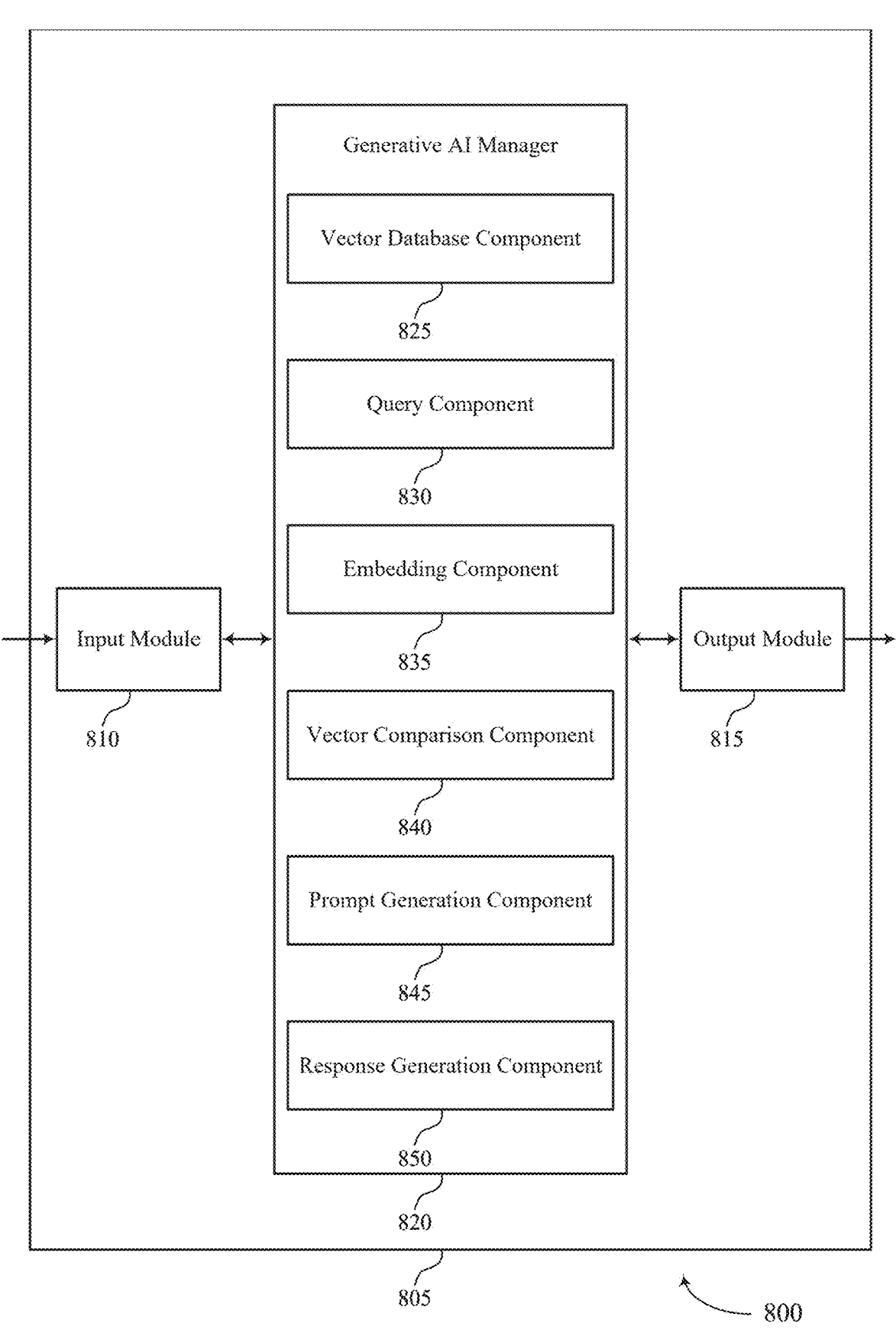
FIG. 8 shows a block diagram of an apparatus that supports locally-stored vector embedding databases in accordance with examples as disclosed herein.

FIG. 8 shows a block diagram 800 of a device 805 that supports locally-stored vector embedding databases in accordance with examples as disclosed herein. The device 805 may include an input module 810, an output module 815, and a generative AI manager 820. The device 805, or one or more components of the device 805 (e.g., the input module 810, the output module 815, the generative AI manager 820), may include at least one processor, which may be coupled with at least one memory, to support the described techniques. Each of these components may be in communication with one another (e.g., via one or more buses).

The input module 810 may manage input signals for the device 805. For example, the input module 810 may identify input signals based on an interaction with a modem, a keyboard, a mouse, a touchscreen, or a similar device. These input signals may be associated with user input or processing at other components or devices. In some cases, the input module 810 may utilize an operating system such as iOS®, ANDROID®, MS-DOS®, MS-WINDOWS®, OS/2®, UNIX®, LINUX®, or another known operating system to handle input signals. The input module 810 may send aspects of these input signals to other components of the device 805 for processing. For example, the input module 810 may transmit input signals to the generative AI manager 820 to support locally-stored vector embedding databases. In some cases, the input module 810 may be a component of an input/output (I/O) controller 1010 as described with reference to FIG. 10.

The output module 815 may manage output signals for the device 805. For example, the output module 815 may receive signals from other components of the device 805, such as the generative AI manager 820, and may transmit these signals to other components or devices. In some examples, the output module 815 may transmit output signals for display in a user interface, for storage in a database or data store, for further processing at a server or server cluster, or for any other processes at any number of devices or systems. In some cases, the output module 815 may be a component of an I/O controller 1010 as described with reference to FIG. 10.

For example, the generative AI manager 820 may include a vector database component 825, a query component 830, an embedding component 835, a vector comparison component 840, a prompt generation component 845, a response generation component 850, or any combination thereof. In some examples, the generative AI manager 820, or various components thereof, may be configured to perform various operations (e.g., receiving, monitoring, transmitting) using or otherwise in cooperation with the input module 810, the output module 815, or both. For example, the generative AI manager 820 may receive information from the input module 810, send information to the output module 815, or be integrated in combination with the input module 810, the output module 815, or both to receive information, transmit information, or perform various other operations as described herein.

The generative AI manager 820 may support generating code using an AI model in accordance with examples as disclosed herein. The vector database component 825 may be configured to support storing a first vector database and a second vector database on a local machine associated with a client, the first vector database including a set of multiple first vector embeddings corresponding with first context information, and the second vector database including a set of multiple second vector embeddings corresponding with second context information. The query component 830 may be configured to support receiving a query from the client requesting generation of code. The embedding component 835 may be configured to support comparing a third vector embedding generated based on the query with the set of multiple first vector embeddings to identify one or more first vector embeddings of the set of multiple first vector embeddings. The vector comparison component 840 may be configured to support comparing the third vector embedding with the set of multiple second vector embeddings to identify one or more second vector embeddings of the set of multiple second vector embeddings. The prompt generation component 845 may be configured to support generating a prompt including the query, first information corresponding to the one or more first vector embeddings, and second information corresponding with the one or more second vector embeddings. The response generation component 850 may be configured to support generating, with the generative AI model, a response to the query based on the query, the first information, and the second information.

Figure 9:
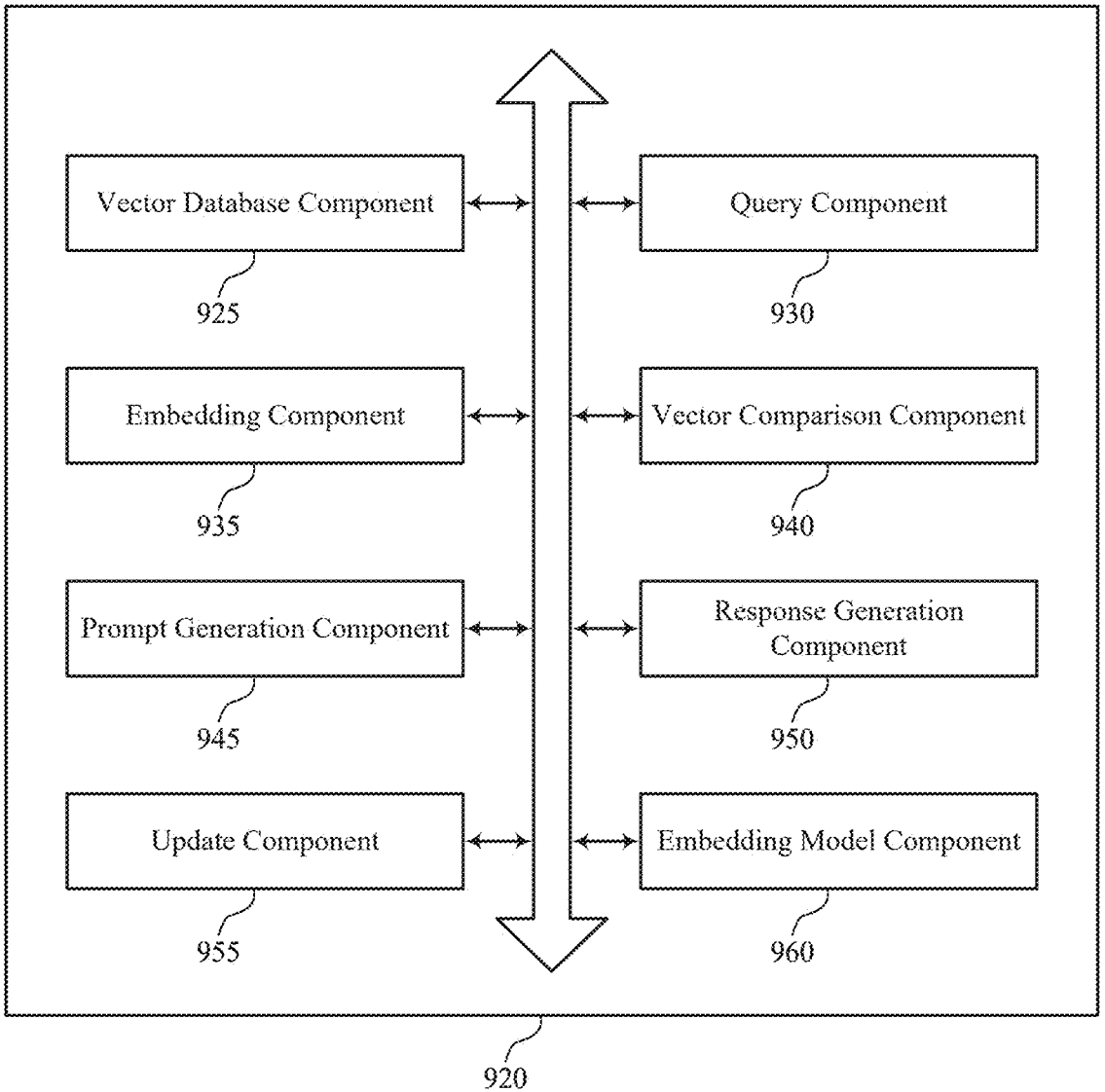
FIG. 9 shows a block diagram of a generative AI manager that supports locally-stored vector embedding databases in accordance with examples as disclosed herein.

FIG. 9 shows a block diagram 900 of a generative AI manager 920 that supports locally-stored vector embedding databases in accordance with examples as disclosed herein. The generative AI manager 920 may be an example of aspects of a generative AI manager or a generative AI manager 820, or both, as described herein. The generative AI manager 920, or various components thereof, may be an example of means for performing various aspects of locally-stored vector embedding databases as described herein. For example, the generative AI manager 920 may include a vector database component 925, a query component 930, an embedding component 935, a vector comparison component

940, a prompt generation component 945, a response generation component 950, an update component 955, an embedding model component 960, or any combination thereof. Each of these components, or components of subcomponents thereof (e.g., one or more processors, one or more memories), may communicate, directly or indirectly, with one another (e.g., via one or more buses).

The generative AI manager 920 may support generating code using an AI model in accordance with examples as disclosed herein. The vector database component 925 may be configured to support storing a first vector database and a second vector database on a local machine associated with a client, the first vector database including a set of multiple first vector embeddings corresponding with first context information, and the second vector database including a set of multiple second vector embeddings corresponding with second context information. The query component 930 may be configured to support receiving a query from the client requesting generation of code. The embedding component 935 may be configured to support comparing a third vector embedding generated based on the query with the set of multiple first vector embeddings to identify one or more first vector embeddings of the set of multiple first vector embeddings. The vector comparison component 940 may be configured to support comparing the third vector embedding with the set of multiple second vector embeddings to identify one or more second vector embeddings of the set of multiple second vector embeddings. The prompt generation component 945 may be configured to support generating a prompt including the query, first information corresponding to the one or more first vector embeddings, and second information corresponding with the one or more second vector embeddings. The response generation component 950 may be configured to support generating, with the generative AI model, a response to the query based on the query, the first information, and the second information.

In some examples, the first context information, the second context information, or both, include class definitions, database schema information, domain specific knowledge, code snippets, or any combination thereof.

In some examples, to support database schema information, the prompt generation component 945 may be configured to support one or more custom object definitions that indicate one or more fields, one or more custom functions, or both.

In some examples, the class definitions are compressed class definitions.

In some examples, the update component 955 may be configured to support updating, at the local machine, the first vector database, the second vector database, or any combination thereof, based on updates to local data performed at the local machine.

In some examples, updating the first vector database, the second vector database, or any combination thereof, is based on a rate of the updates to the local data satisfying an update rate threshold.

In some examples, comparing the third vector embedding with the set of multiple first vector embeddings is based on first vector similarity scores associated with the one or more first vector embeddings satisfying a first vector embedding score threshold. In some examples, comparing the third vector embedding with the set of multiple second vector embeddings is based on second vector similarity scores associated with the one or more second vector embeddings satisfying a second vector embedding score threshold.

In some examples, the first vector embedding score threshold is different than the second vector embedding score threshold.

In some examples, the embedding model component 960 may be configured to support generating, based on an embedding model, the first vector database based on the first context information. In some examples, the embedding model component 960 may be configured to support generating, based on the embedding model, the second vector database based on the second context information.

In some examples, the third vector embedding is based on the embedding model.

In some examples, the embedding model is located at a server that is remote to the local machine.

In some examples, the first context information corresponds with a first processing context. In some examples, the second context information corresponds with a second processing context that is different than the first processing context.

Figure 10:
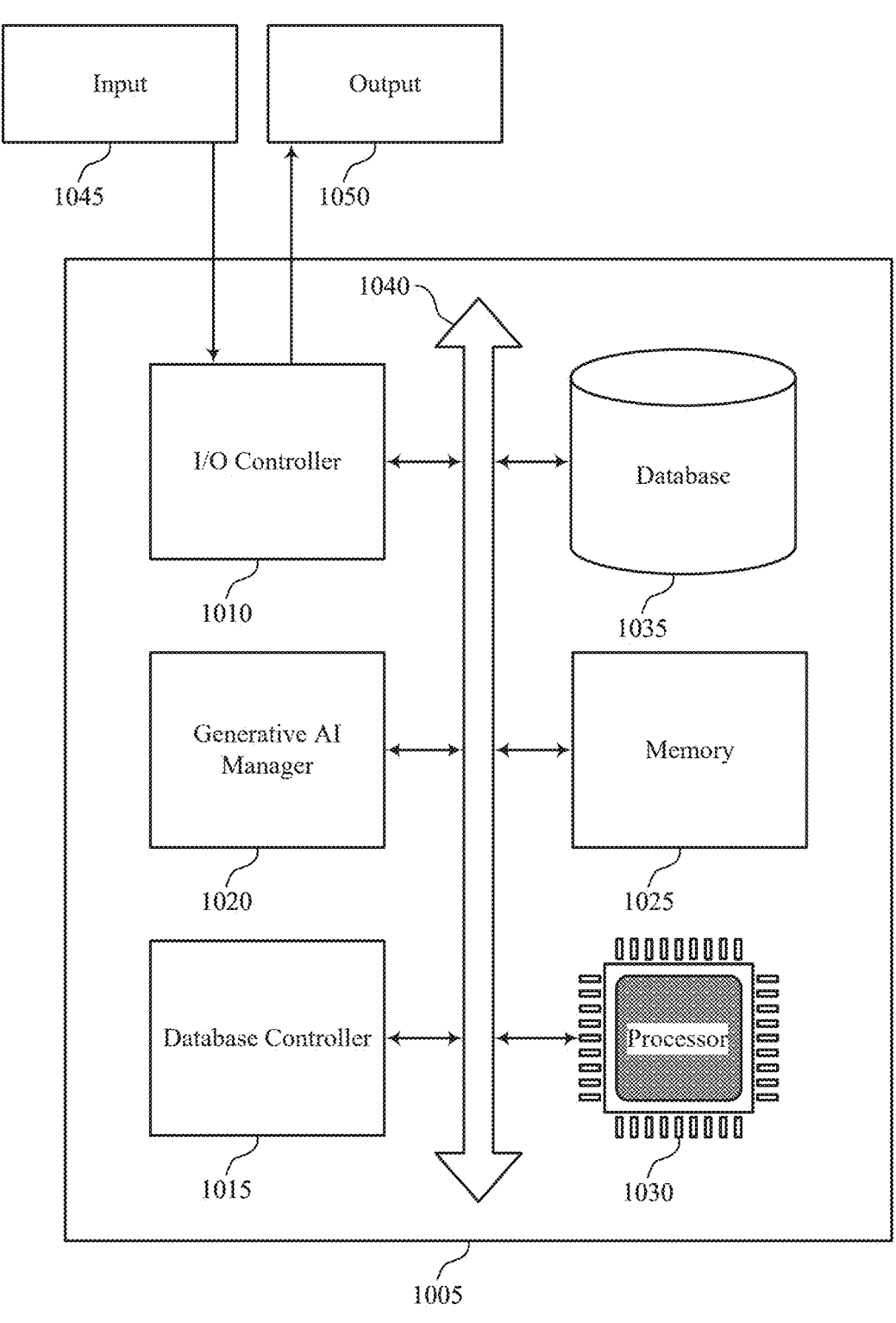
FIG. 10 shows a diagram of a system including a device that supports locally-stored vector embedding databases in accordance with examples as disclosed herein.

FIG. 10 shows a diagram of a system 1000 including a device 1005 that supports locally-stored vector embedding databases in accordance with examples as disclosed herein. The device 1005 may be an example of or include components of a device 805 as described herein. The device 1005 may include components for bi-directional data communications including components for transmitting and receiving communications, such as a generative AI manager 1020, an I/O controller, such as an I/O controller 1010, a database controller 1015, at least one memory 1025, at least one processor 1030, and a database 1035. These components may be in electronic communication or otherwise coupled (e.g., operatively, communicatively, functionally, electronically, electrically) via one or more buses (e.g., a bus 1040).

The I/O controller 1010 may manage input signals 1045 and output signals 1050 for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. In other cases, the I/O controller 1010 may represent or interact with a modem, a keyboard, a mouse, a touchscreen, or a similar device. In some cases, the I/O controller 1010 may be implemented as part of a processor 1030. In some examples, a user may interact with the device 1005 via the I/O controller 1010 or via hardware components controlled by the I/O controller 1010.

The database controller 1015 may manage data storage and processing in a database 1035. In some cases, a user may interact with the database controller 1015. In other cases, the database controller 1015 may operate automatically without user interaction. The database 1035 may be an example of a single database, a distributed database, multiple distributed databases, a data store, a data lake, or an emergency backup database.

Memory 1025 may include random-access memory (RAM) and read-only memory (ROM). The memory 1025 may store computer-readable, computer-executable software including instructions that, when executed, cause at least one processor 1030 to perform various functions described herein. In some cases, the memory 1025 may contain, among other things, a basic I/O system (BIOS) which may control basic hardware or software operation such as the interaction with peripheral components or devices. The memory 1025 may be an example of a single memory or multiple memories. For example, the device 1005 may include one or more memories 1025.

The processor 1030 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 1030 may be configured to operate a memory array using a memory controller. In other cases, a memory controller may be integrated into the processor 1030. The processor 1030 may be configured to execute computer-readable instructions stored in at least one memory 1025 to perform various functions (e.g., functions or tasks supporting locally-stored vector embedding databases). The processor 1030 may be an example of a single processor or multiple processors. For example, the device 1005 may include one or more processors 1030.

The generative AI manager 1020 may support generating code using a generative AI model in accordance with examples as disclosed herein. For example, the generative AI manager 1020 may be configured to support storing a first vector database and a second vector database on a local machine associated with a client, the first vector database including a set of multiple first vector embeddings corresponding with first context information, and the second vector database including a set of multiple second vector embeddings corresponding with second context information. The generative AI manager 1020 may be configured to support receiving a query from the client requesting generation of code. The generative AI manager 1020 may be configured to support comparing a third vector embedding generated based on the query with the set of multiple first vector embeddings to identify one or more first vector embeddings of the set of multiple first vector embeddings. The generative AI manager 1020 may be configured to support comparing the third vector embedding with the set of multiple second vector embeddings to identify one or more second vector embeddings of the set of multiple second vector embeddings. The generative AI manager 1020 may be configured to support generating a prompt including the query, first information corresponding to the one or more first vector embeddings, and second information corresponding with the one or more second vector embeddings. The generative AI manager 1020 may be configured to support generating, with the generative AI model, a response to the query based on the query, the first information, and the second information.

By including or configuring the generative AI manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

FIG. 11 shows a flowchart illustrating a method 1100 that supports locally-stored vector embedding databases in accordance with examples as disclosed herein. The operations of the method 1100 may be implemented by an application server or its components as described herein. For example, the operations of the method 1100 may be performed by an application server as described with reference to FIGS. 1 through 10. In some examples, an application server may execute a set of instructions to control the functional elements of the application server to perform the described functions. Additionally, or alternatively, the application server may perform aspects of the described functions using special-purpose hardware.

At 1105, the method may include storing a first vector database and a second vector database on a local machine associated with a client, the first vector database including a set of multiple first vector embeddings corresponding with first context information, and the second vector database including a set of multiple second vector embeddings corresponding with second context information. The operations of 1105 may be performed in accordance with examples as disclosed herein. In some examples, aspects of the operations of 1105 may be performed by a vector database component 925 as described with reference to FIG. 9.

At 1110, the method may include receiving a query from the client requesting generation of code. The operations of 1110 may be performed in accordance with examples as disclosed herein. In some examples, aspects of the operations of 1110 may be performed by a query component 930 as described with reference to FIG. 9.

At 1115, the method may include comparing a third vector embedding generated based on the query with the set of multiple first vector embeddings to identify one or more first vector embeddings of the set of multiple first vector embeddings. The operations of 1115 may be performed in accordance with examples as disclosed herein. In some examples, aspects of the operations of 1115 may be performed by an embedding component 935 as described with reference to FIG. 9.

At 1120, the method may include comparing the third vector embedding with the set of multiple second vector embeddings to identify one or more second vector embeddings of the set of multiple second vector embeddings. The operations of 1120 may be performed in accordance with examples as disclosed herein. In some examples, aspects of the operations of 1120 may be performed by a vector comparison component 940 as described with reference to FIG. 9.

At 1125, the method may include generating a prompt including the query, first information corresponding to the one or more first vector embeddings, and second information corresponding with the one or more second vector embeddings. The operations of 1125 may be performed in accordance with examples as disclosed herein. In some examples, aspects of the operations of 1125 may be performed by a prompt generation component 945 as described with reference to FIG. 9.

At 1130, the method may include generating, with the generative AI model, a response to the query based on the query, the first information, and the second information. The operations of 1130 may be performed in accordance with examples as disclosed herein. In some examples, aspects of the operations of 1130 may be performed by a response generation component 950 as described with reference to FIG. 9.

A method for generating code using a generative AI model by an apparatus is described. The method may include storing a first vector database and a second vector database on a local machine associated with a client, the first vector database including a set of multiple first vector embeddings corresponding with first context information, and the second vector database including a set of multiple second vector embeddings corresponding with second context information, receiving a query from the client requesting generation of code, comparing a third vector embedding generated based on the query with the set of multiple first vector embeddings to identify one or more first vector embeddings of the set of multiple first vector embeddings, comparing the third vector embedding with the set of multiple second vector embeddings to identify one or more second vector embeddings of the set of multiple second vector embeddings, generating a prompt including the query, first information corresponding to the one or more first vector embeddings, and second information corresponding with the one or more second vector embeddings, and generating, with the generative AI model, a response to the query based on the query, the first information, and the second information.

An apparatus for generating code using a generative AI model is described. The apparatus may include one or more memories storing processor executable coded instructions, and one or more processors coupled with the one or more memories. The one or more processors may individually or collectively be operable to execute the code to cause the apparatus to store a first vector database and a second vector database on a local machine associated with a client, the first vector database including a set of multiple first vector embeddings corresponding with first context information, and the second vector database including a set of multiple second vector embeddings corresponding with second context information, receive a query from the client requesting generation of code, compare a third vector embedding generated based on the query with the set of multiple first vector embeddings to identify one or more first vector embeddings of the set of multiple first vector embeddings, compare the third vector embedding with the set of multiple second vector embeddings to identify one or more second vector embeddings of the set of multiple second vector embeddings, generate a prompt including the query, first information corresponding to the one or more first vector embeddings, and second information corresponding with the one or more second vector embeddings, and generate, with the generative AI model, a response to the query based on the query, the first information, and the second information.

Another apparatus for generating code using a generative AI model is described. The apparatus may include means for storing a first vector database and a second vector database on a local machine associated with a client, the first vector database including a set of multiple first vector embeddings corresponding with first context information, and the second vector database including a set of multiple second vector embeddings corresponding with second context information, means for receiving a query from the client requesting generation of code, means for comparing a third vector embedding generated based on the query with the set of multiple first vector embeddings to identify one or more first vector embeddings of the set of multiple first vector embeddings, means for comparing the third vector embedding with the set of multiple second vector embeddings to identify one or more second vector embeddings of the set of multiple second vector embeddings, means for generating a prompt including the query, first information corresponding to the one or more first vector embeddings, and second information corresponding with the one or more second vector embeddings, and means for generating, with the generative AI model, a response to the query based on the query, the first information, and the second information.

A non-transitory computer-readable medium storing coded instructions for generating code using a generative AI model is described. The coded instructions may include instructions executable by one or more processors to store a first vector database and a second vector database on a local machine associated with a client, the first vector database including a set of multiple first vector embeddings corresponding with first context information, and the second vector database including a set of multiple second vector embeddings corresponding with second context information, receive a query from the client requesting generation of code, compare a third vector embedding generated based on the query with the set of multiple first vector embeddings to identify one or more first vector embeddings of the set of multiple first vector embeddings, compare the third vector embedding with the set of multiple second vector embeddings to identify one or more second vector embeddings of the set of multiple second vector embeddings, generate a prompt including the query, first information corresponding to the one or more first vector embeddings, and second information corresponding with the one or more second vector embeddings, and generate, with the generative AI model, a response to the query based on the query, the first information, and the second information.

In some examples of the method, apparatus, and non-transitory computer-readable medium described herein, the first context information, the second context information, or both, include class definitions, database schema information, domain specific knowledge, code snippets, or any combination thereof.

In some examples of the method, apparatus, and non-transitory computer-readable medium described herein, the database schema information may include operations, features, means, or instructions for one or more custom object definitions that indicate one or more fields, one or more custom functions, or both.

In some examples of the method, apparatus, and non-transitory computer-readable medium described herein, the class definitions may be compressed class definitions.

Some examples of the method, apparatus, and non-transitory computer-readable medium described herein may further include operations, features, means, or instructions for updating, at the local machine, the first vector database, the second vector database, or any combination thereof, based on updates to local data performed at the local machine.

Some examples of the method, apparatus, and non-transitory computer-readable medium described herein may further include operations, features, means, or instructions for updating the first vector database, the second vector database, or any combination thereof, may be based on a rate of the updates to the local data satisfying an update rate threshold.

Some examples of the method, apparatus, and non-transitory computer-readable medium described herein may further include operations, features, means, or instructions for comparing the third vector embedding with the set of multiple first vector embeddings may be based on first vector similarity scores associated with the one or more first vector embeddings satisfying a first vector embedding score threshold and comparing the third vector embedding with the set of multiple second vector embeddings may be based on second vector similarity scores associated with the one or more second vector embeddings satisfying a second vector embedding score threshold.

In some examples of the method, apparatus, and non-transitory computer-readable medium described herein, the first vector embedding score threshold may be different than the second vector embedding score threshold.

Some examples of the method, apparatus, and non-transitory computer-readable medium described herein may further include operations, features, means, or instructions for generating, based on an embedding model, the first vector database based on the first context information and generating, based on the embedding model, the second vector database based on the second context information.

In some examples of the method, apparatus, and non-transitory computer-readable medium described herein, the third vector embedding may be based on the embedding model.

In some examples of the method, apparatus, and non-transitory computer-readable medium described herein, the embedding model may be located at a server that may be remote to the local machine.

In some examples of the method, apparatus, and non-transitory computer-readable medium described herein, the first context information corresponds with a first processing context and the second context information corresponds with a second processing context that may be different than the first processing context.

The following provides an overview of aspects of the present disclosure:

Aspect 1: A method for generating code using a generative AI model, the method comprising: storing a first vector database and a second vector database on a local machine associated with a client, the first vector database comprising a plurality of first vector embeddings corresponding with first context information, and the second vector database comprising a plurality of second vector embeddings corresponding with second context information; receiving a query from the client requesting generation of code; comparing a third vector embedding generated based at least in part on the query with the plurality of first vector embeddings to identify one or more first vector embeddings of the plurality of first vector embeddings; comparing the third vector embedding with the plurality of second vector embeddings to identify one or more second vector embeddings of the plurality of second vector embeddings; generating a prompt comprising the query, first information corresponding to the one or more first vector embeddings, and second information corresponding with the one or more second vector embeddings; and generating, with the generative AI model, a response to the query based at least in part on the query, the first information, and the second information.

Aspect 2: The method of aspect 1, wherein the first context information, the second context information, or both, comprise class definitions, database schema information, domain specific knowledge, code snippets, or any combination thereof.

Aspect 3: The method of aspect 2, wherein the database schema information comprises: one or more custom object definitions that indicate one or more fields, one or more custom functions, or both.

Aspect 4: The method of any of aspects 2 through 3, wherein the class definitions are compressed class definitions.

Aspect 5: The method of any of aspects 1 through 4, further comprising: updating, at the local machine, the first vector database, the second vector database, or any combination thereof, based at least in part on updates to local data performed at the local machine.

Aspect 6: The method of aspect 5, wherein updating the first vector database, the second vector database, or any combination thereof, is based at least in part on a rate of the updates to the local data satisfying an update rate threshold.

Aspect 7: The method of any of aspects 1 through 6, wherein comparing the third vector embedding with the plurality of first vector embeddings is based at least in part on first vector similarity scores associated with the one or more first vector embeddings satisfying a first vector embedding score threshold; and comparing the third vector embedding with the plurality of second vector embeddings is based at least in part on second vector similarity scores associated with the one or more second vector embeddings satisfying a second vector embedding score threshold.

Aspect 8: The method of aspect 7, wherein the first vector embedding score threshold is different than the second vector embedding score threshold.

Aspect 9: The method of any of aspects 1 through 8, further comprising: generating, based at least in part on an embedding model, the first vector database based at least in part on the first context information; and generating, based at least in part on the embedding model, the second vector database based at least in part on the second context information.

Aspect 10: The method of aspect 9, wherein the third vector embedding is based at least in part on the embedding model.

Aspect 11: The method of any of aspects 9 through 10, wherein the embedding model is located at a server that is remote to the local machine.

Aspect 12: The method of any of aspects 1 through 11, wherein the first context information corresponds with a first processing context; and the second context information corresponds with a second processing context that is different than the first processing context.

Aspect 13: An apparatus for generating code using a generative AI model, comprising one or more memories storing processor-executable coded instructions, and one or more processors coupled with the one or more memories and individually or collectively operable to execute the coded instructions to cause the apparatus to perform a method of any of aspects 1 through 12.

Aspect 14: An apparatus for generating code using a generative AI model, comprising at least one means for performing a method of any of aspects 1 through 12.

Aspect 15: A non-transitory computer-readable medium storing coded instructions for generating code using a generative AI model, the code comprising instructions executable by one or more processors to perform a method of any of aspects 1 through 12.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code or coded instructions on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for generating code using a generative artificial intelligence (AI) model, the method comprising:
   storing a first vector database and a second vector database on a local machine associated with a client, the first vector database comprising a plurality of first vector embeddings corresponding with first context information, and the second vector database comprising a plurality of second vector embeddings corresponding with second context information;
   updating, at the local machine, the first vector database, the second vector database, or any combination thereof, based at least in part on updates to local data performed at the local machine and further based at least in part on a rate of the updates to the local data satisfying an update rate threshold;
   receiving a query from the client requesting generation of code;
   comparing a third vector embedding generated based at least in part on the query with the plurality of first vector embeddings to identify one or more first vector embeddings of the plurality of first vector embeddings;
   comparing the third vector embedding with the plurality of second vector embeddings to identify one or more second vector embeddings of the plurality of second vector embeddings;
   generating a prompt comprising the query, first information corresponding to the one or more first vector embeddings, and second information corresponding with the one or more second vector embeddings; and
   generating, with the generative AI model, a response to the query based at least in part on the query, the first information, and the second information.

2. The method of claim 1, wherein:
   comparing the third vector embedding with the plurality of first vector embeddings is based at least in part on first vector similarity scores associated with the one or more first vector embeddings satisfying a first vector embedding score threshold; and
   comparing the third vector embedding with the plurality of second vector embeddings is based at least in part on second vector similarity scores associated with the one or more second vector embeddings satisfying a second vector embedding score threshold.

3. The method of claim 2, wherein the first vector embedding score threshold is different than the second vector embedding score threshold.

4. The method of claim 1, wherein the first context information, the second context information, or both, comprise class definitions, database schema information, domain specific knowledge, code snippets, or any combination thereof.

5. The method of claim 4, wherein the database schema information comprises:
   one or more custom object definitions that indicate one or more fields, one or more custom functions, or both.

6. The method of claim 4, wherein the class definitions are compressed class definitions.

7. The method of claim 1, further comprising:
   generating, based at least in part on an embedding model, the first vector database based at least in part on the first context information; and
   generating, based at least in part on the embedding model, the second vector database based at least in part on the second context information.

8. The method of claim 7, wherein the third vector embedding is based at least in part on the embedding model.

9. The method of claim 7, wherein the embedding model is located at a server that is remote to the local machine.

10. The method of claim 1, wherein:
   the first context information corresponds with a first processing context; and
   the second context information corresponds with a second processing context that is different than the first processing context.

11. An apparatus for generating code using a generative artificial intelligence (AI) model, comprising:
   one or more memories storing processor-executable coded instructions; and one or more processors coupled with the one or more memories and individually or collectively operable to execute the coded instructions to cause the apparatus to:

store a first vector database and a second vector database on a local machine associated with a client, the first vector database comprising a plurality of first vector embeddings corresponding with first context information, and the second vector database comprising a plurality of second vector embeddings corresponding with second context information;

update, at the local machine, the first vector database, the second vector database, or any combination thereof, based at least in part on updates to local data performed at the local machine and further based at least in part on a rate of the updates to the local data satisfying an update rate threshold;

receive a query from the client requesting generation of code;

compare a third vector embedding generated based at least in part on the query with the plurality of first vector embeddings to identify one or more first vector embeddings of the plurality of first vector embeddings;

compare the third vector embedding with the plurality of second vector embeddings to identify one or more second vector embeddings of the plurality of second vector embeddings;

generate a prompt comprising the query, first information corresponding to the one or more first vector embeddings, and second information corresponding with the one or more second vector embeddings; and generate, with the generative AI model, a response to the query based at least in part on the query, the first information, and the second information.

12. The apparatus of claim 11, wherein:

comparing the third vector embedding with the plurality of first vector embeddings is based at least in part on first vector similarity scores associated with the one or more first vector embeddings satisfying a first vector embedding score threshold; and comparing the third vector embedding with the plurality of second vector embeddings is based at least in part on second vector similarity scores associated with the one or more second vector embeddings satisfying a second vector embedding score threshold.

13. The apparatus of claim 12, wherein the first vector embedding score threshold is different than the second vector embedding score threshold.

14. The apparatus of claim 11, wherein the first context information, the second context information, or both, comprise class definitions, database schema information, domain specific knowledge, code snippets, or any combination thereof.

15. The apparatus of claim 14, wherein the database schema information comprises one or more custom object definitions that indicate one or more fields, one or more custom functions, or both.

16. A non-transitory computer-readable medium storing coded instructions for generating code using a generative artificial intelligence (AI) model, the coded instructions comprising instructions executable by one or more processors to:

store a first vector database and a second vector database on a local machine associated with a client, the first vector database comprising a plurality of first vector embeddings corresponding with first context information, and the second vector database comprising a plurality of second vector embeddings corresponding with second context information;

update, at the local machine, the first vector database, the second vector database, or any combination thereof, based at least in part on updates to local data performed at the local machine and further based at least in part on a rate of the updates to the local data satisfying an update rate threshold;

receive a query from the client requesting generation of code;

compare a third vector embedding generated based at least in part on the query with the plurality of first vector embeddings to identify one or more first vector embeddings of the plurality of first vector embeddings;

compare the third vector embedding with the plurality of second vector embeddings to identify one or more second vector embeddings of the plurality of second vector embeddings;

generate a prompt comprising the query, first information corresponding to the one or more first vector embeddings, and second information corresponding with the one or more second vector embeddings; and generate, with the generative AI model, a response to the query based at least in part on the query, the first information, and the second information.

* * * * *